M. B. DISKIN.
BOX MAKING MACHINE.
APPLICATION FILED MAY 9, 1918.

1,343,906.

Patented June 22, 1920.
6 SHEETS—SHEET 1.

Fig. 1.

Inventor
Moses B. Diskin
Fitz Gerald & Co
Attorneys

M. B. DISKIN.
BOX MAKING MACHINE.
APPLICATION FILED MAY 9, 1918.

1,343,906.

Patented June 22, 1920.
6 SHEETS—SHEET 2.

Fig. 2.

Inventor
Moses B. Diskin
Fitz Gerald & Co
Attorneys

M. B. DISKIN.
BOX MAKING MACHINE.
APPLICATION FILED MAY 9, 1918.

1,343,906.

Patented June 22, 1920.
6 SHEETS—SHEET 3.

Inventor
Moses B. Diskin
Fitz Gerald &Co.
Attorneys

M. B. DISKIN.
BOX MAKING MACHINE.
APPLICATION FILED MAY 9, 1918.

1,343,906.

Patented June 22, 1920.
6 SHEETS—SHEET 4.

Inventor
Moses B. Diskin
Fitz Gerald & Co.
Attorneys

UNITED STATES PATENT OFFICE.

MOSES B. DISKIN, OF NEW YORK, N. Y.

BOX-MAKING MACHINE.

1,343,906.  Specification of Letters Patent.  Patented June 22, 1920.

Application filed May 9, 1918. Serial No. 233,533.

*To all whom it may concern:*

Be it known that I, MOSES B. DISKIN, a citizen of the United States, residing at New York city, in the county of New York and State of New York, have invented certain new and useful Improvements in Box-Making Machines; and I do hereby declare the following to be a full, clear, and exact description of the invention, such as will enable others skilled in the art to which it appertains to make and use the same.

This invention relates to a new and useful box making machine and the principal object of the invention is to provide a machine of this character by which boxes, either cylindrical or oval, can be made in their entirety with one operation of the machine.

Another object of the invention is to provide means for covering the box body card board blanks with paper prior to being wound into cylindrical or oval form.

Another object of the invention is to provide the rotatable body form with means for holding the box bottom while the body of the box is being formed and secured to it.

A further object of the invention is to provide means for interposing a strip of tape between the box body blank and its paper covering to form a reinforcing for the connection of the box bottom with the body thereof.

A still further object of the invention is to provide a box making machine of the above stated character which can be quickly and readily adjusted to make boxes of various sizes.

A still further object of the invention is to provide means for automatically ejecting the box after its completion from the form.
With these and other objects in view as will appear as the description proceeds, the invention comprises the various novel features of construction, combination and arrangement of parts as will be fully described hereinafter and afterward specifically claimed.

Referring to the drawings.

In order that the construction and operation of the invention may be readily comprehended by those skilled in the art to which the invention relates, I have illustrated the preferred form of my invention and will now proceed to fully describe the same in connection with said drawings, in which—

Figure 1:
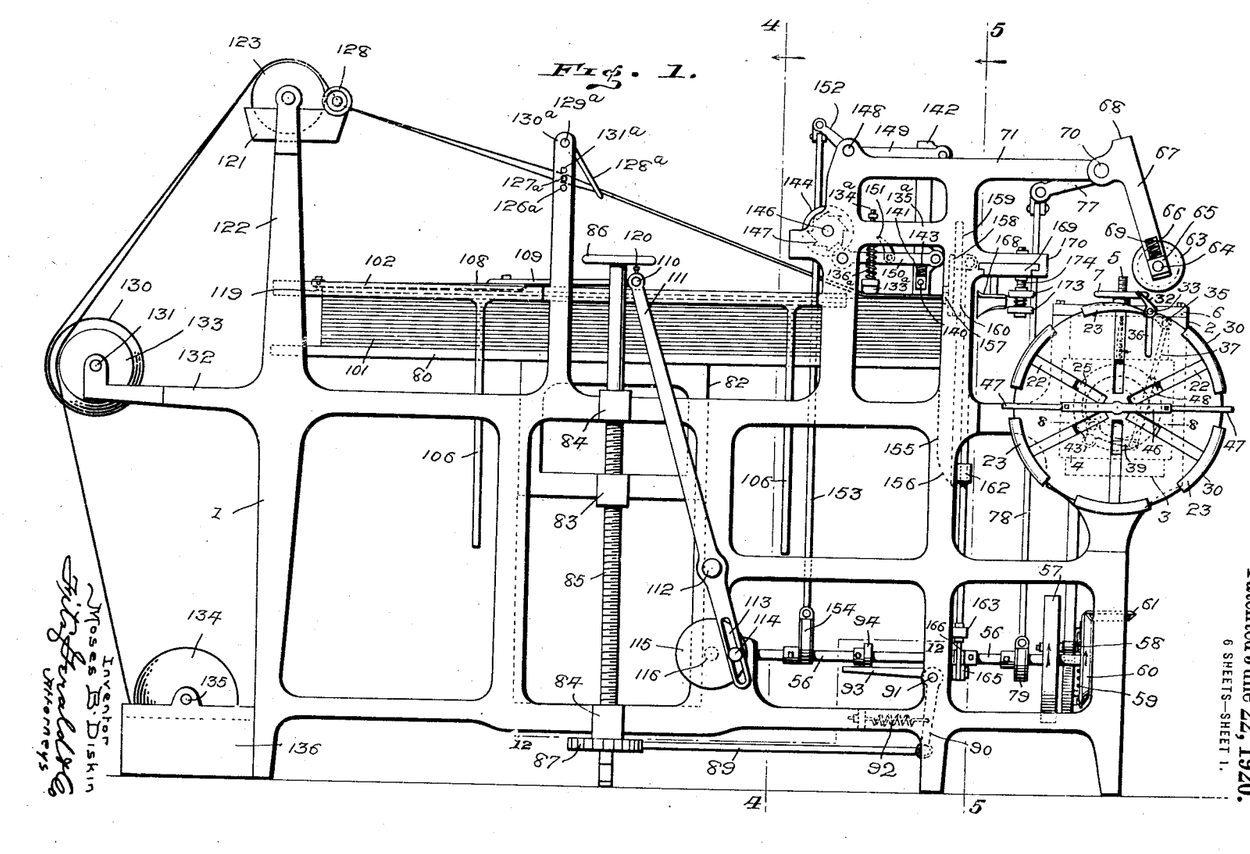
Figure 1 represents a side elevation of the box making machine.
Figures 6, 7, 13, 14:
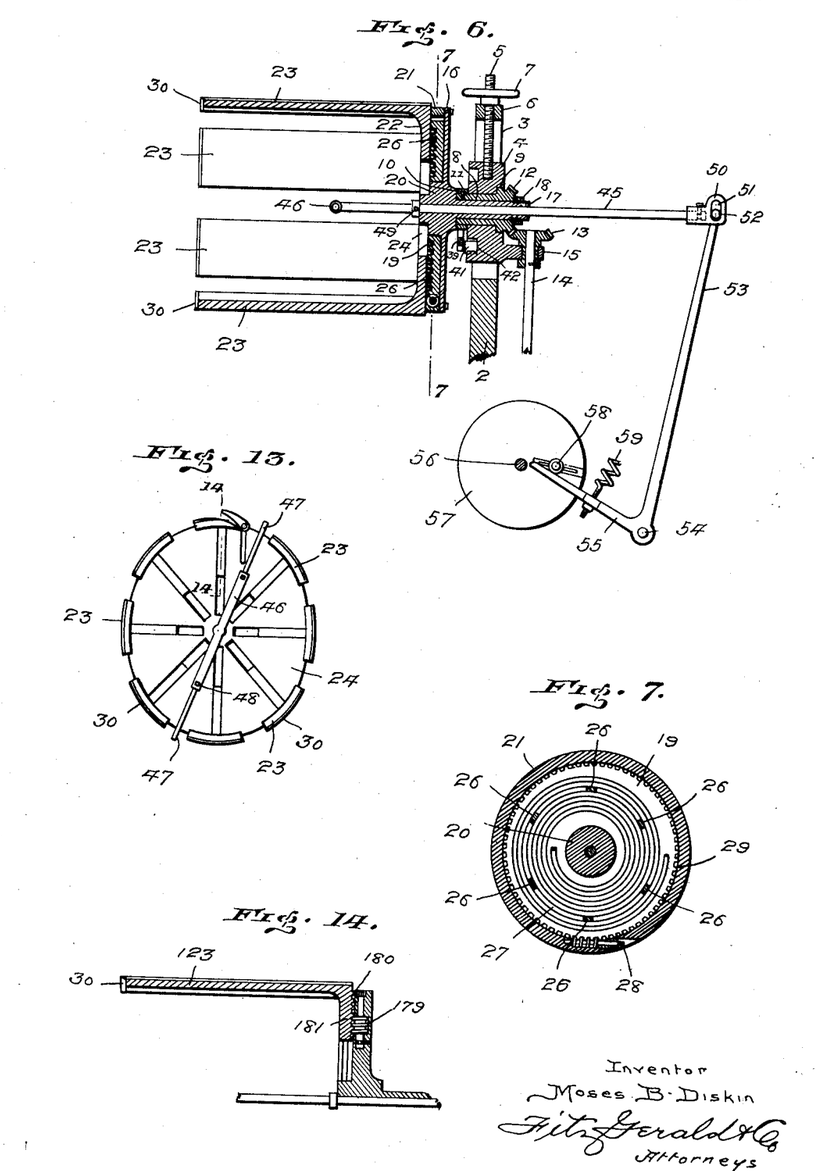
Fig. 6 represents a longitudinal sectional view through the rotatable box form with the ejector means operatively associated therewith.
Fig. 7 represents a sectional elevation taken on a plane indicated by the line 7—7 on Fig. 6.
Fig. 13 represents an end elevation of the elliptical box form.
Fig. 14 represents a longitudinal sectional view taken on a plane indicated by the line 14—14 on Fig. 13.

1 indicates the frame of the machine which at the rear right hand side is provided with an upstanding portion 2 having a vertical recess 3 in which is mounted a bearing block 4, the opposite vertical edges of which are channeled to receive and embrace the opposite side edges of the frame forming the recess 3 for vertical adjustment, as clearly shown in Figs. 1 and 6. 5 is a threaded rod having its lower end fixed to the bearing block and its upper end projecting through an opening in the cross-bar 6 closing the upper end of the recess 3, and is provided with a hand wheel 7 bearing upon the cross-bar. By rotating this hand wheel 7 the bearing block can be vertically adjusted as desired to compensate for any variations in the diameter of the box form that is made.

A gear sleeve 8 extends centrally through the bearing block until the shoulder 9 rests within the countersink formed in its outer face. A retaining ring 10 is positioned over the inner end of the sleeve to bear against the inner face of the bearing block and is secured in place by a set screw 11. 12 is a bevel gear on the outer end of the sleeve and meshes with a similar gear 13 fixed on the upper end of a shaft 14 and journaled in a bracket 15 carried by the bearing block.

The bearing block 4 is adapted to rotatably support the box form which comprises a head plate 16 having a spindle 17 projecting centrally therefrom and rotatably mounted in the sleeve 8, a nut 18 being threaded on the end of the spindle to clamp the spindle rigidly to the gear sleeve 8 so that they will rotate together. Any other suitable means may be used to detachably but rigidly connect the spindle with the gear sleeve that may be desired. 19 is a cam plate provided with a central opening to receive the hub 20 on the inner face of the head plate. 21 is a head rim attached to the edge of the head plate and is provided in its circumference with radially disposed T-slots to slidably receive the T-heads 22 carried by the segments 23. 24 is an inner cover plate secured to the head rim 21 and provided with a central opening to receive the reduced inner end of the hub 20, said plate being provided with radial slots 25 to also receive the T-heads. Each of the T-heads is provided with a laterally projecting lug 26 which rides in a spiral cam groove 27 formed in the inner face of the cam plate 19. 28 indicates an adjustment screw journaled in the head rim and meshing with the toothed peripheral edge 29 of the cam plate. By adjusting the screw 28 the segments 23 can either be extended or contracted to make a larger or smaller box form. The outer free edge of each segment 23 is provided with a knife edge 30 which is of a length equal to about half of the thickness of the card board bottom for the box, as clearly shown in Fig. 16. These knife edges serve to hold the box bottom in place while the box body is being wound around the form, however should these knife edges not be sufficient to effectively hold the bottom in place, the hand of the operator can be rested against the central portion of the bottom to hold it in position while the box is being formed.

Figures 12, 15:
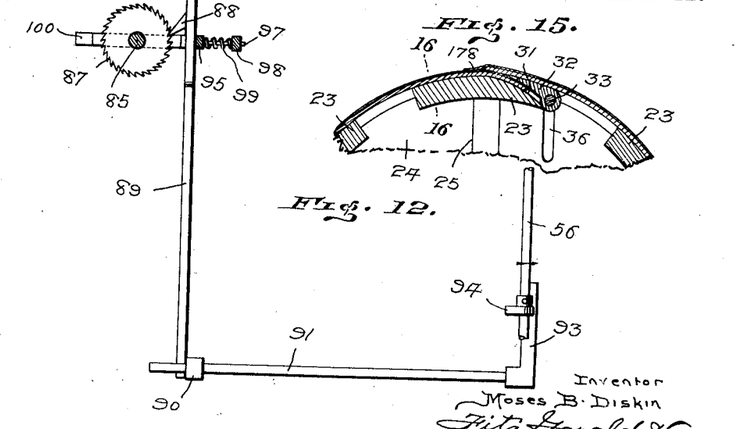
Fig. 12 represents a diagrammatical plan view taken on a plane indicated by the line 12—12 on Fig. 1.
Fig. 15 represents a detail sectional view through the rotatable form with a box formed thereon showing the manner of connecting the overlapping ends of the box body.

One of the segments 23 has its outer surface curved inwardly toward one side edge as at 31, Fig. 15, and hingedly connected to the reduced edge of the segment is a gripper bar 32, said gripper bar being fixed on a rock shaft 33 mounted in bearings 34 carried by the reduced side edge of the segment 23. This shaft 33 projects beyond the form head plate and is provided with an arm 35. 36 is a slot formed in the inner cover plate 24 to permit of the free movement of the shaft 33 with the radial adjustment of its supporting segment 23.

Figure 8:
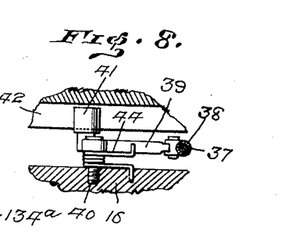
Fig. 8 represents a sectional detail view taken on a plane indicated by the line 8—8 on Fig. 1.
Figure 9:
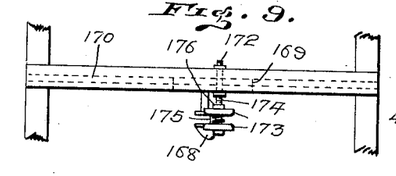
Fig. 9 represents a front elevation of the adjustable edge finishing means.

37 and 38 are adjustably connected members which serve to connect the arm 35 with one end of a trip arm 39 pivotally mounted at its other end on a stud 40 carried by the head plate 16. This trip arm carries adjacent its pivot a laterally projecting roller 41 which rides in a circular groove 42 in the bearing block 4, said groove being arranged concentric of the axis of the form and is provided at a certain point with a recess 43 into which the roller 41 is adapted to drop under the tension of the spring 44, Fig. 8, to elevate the gripper bar 32.

The rotatable box form is provided with a box ejector which consists of an ejector rod 45 slidably mounted through the spindle 17 and provided at its inner end with a cross-head 46 which is made hollow for the reception of extensible arms 47 which are held in adjusted position by set screws 48. 49 is an adjustable collar on the rod 45 and serves to limit the outward movement of the rod.

The outer end of the ejector rod is fixed but rotatably connected to a member 50 which is provided with an elongated slot 51 to receive a rod 52 projecting laterally from the upper end of a rocker arm 53 pivotally supported at 54 in the frame 1. This rocker arm is provided at its lower end with a laterally projecting arm 55. 56 is a power shaft journaled in the main frame and carries a cam wheel 57, laterally from which projects a radially adjustable roller 58. This roller is so arranged and its movement so timed that it will engage the arm 55 upon the completion of a box on the form and actuate the ejector mechanism to eject the box from the form. 59 is a retractile spring adjustably connected between the arm 55 and the frame 1 and serves to return the ejector mechanism to its normal position immediately after each actuation.

60 is a mutilated gear mounted on power shaft 56 and is adapted to engage and actuate a bevel gear 61 journaled in a suitable bracket 62 on the main frame. The lower end of the shaft 14 is feathered through the gear 61 so that any rotation of the gear 61 will be likewise communicated to the shaft 14 which in turn will rotate the box form. By feathering the shaft 14 through the gear 61, means is provided for the vertical adjustment of the box form.

63 is a press roller slidably feathered on a shaft 64 journaled in bearing blocks 65 yieldingly mounted in slots 66 in the lower ends of the arms 67 of the U-shaped frame member 68 under the tension of springs 69, said U-shaped frame being pivoted as at 70 to extensions 71 of the main frame. An adjusting nut 72 is mounted on the shaft 64 and serves as a means to adjust the press roller longitudinally on the shaft against the tension of a spring 73, whose tension may be varied by a nut 74. The press roller is provided at one end with a turning flange 75 which coöperates with the free end of the box form to turn the paper covering and binding tape over the circumferential edge of the box bottom. By yieldingly mounting the press roller against the tension of the spring 73 provision is made against choking of the material between the flange 75 and the free end of the box form. 76 indicate circumferential grooves formed in the press roller to permit of the free ends of the ejector arms 47 to pass during the rotation of the box form.

A rocker arm 77 is fixed to the right hand pivot 70 of the U-shaped frame 68 and when actuated serves to swing the press roller 63 out of engagement with the rotatable form. 78 indicates a rod connected to the arm 77 and to an eccentric 79 on the power shaft 56. This mechanism is so timed that the press roller will swing up over the form immediately after the formation of each box.

80 is a table for the support of a stack of box body card board blanks and is mounted on a bracket 81 provided with a T-head 82 vertically adjustably mounted in the left hand side of the main frame. 83 is a lug carried by the lower end of the T-head and is disposed in vertical alinement with lugs 84 mounted on the main frame, a feed shaft 85 being journaled in the lugs 84 and threaded through the lug 83. 86 is a hand wheel attached to the upper end of the feed shaft for the purpose of lowering the table after it has reached the limit of its upward movement.

The table is adapted to be automatically fed upward by a ratchet mechanism operatively connected to the power shaft and comprises a ratchet wheel 87 fixed on the lower end of the feed shaft 85 which is actuated by a pawl 88 carried by one end of a ratchet rod 89, the opposite end of which is pivotally connected to an arm 90 fixed on the rock shaft 91 disposed transversely of and journaled in the main frame. A retractile spring 92 is connected to the arm 90 and to the main frame and serves to return the arm to its normal position after each actuation. The rock shaft 91 is also provided with an arm 93 which projects horizontally beneath the power shaft and is engaged to be actuated by a cam 94 on the power shaft.

The free end of the ratchet rod 89 is slidably mounted in a guide block 95 which is slidably supported for lateral movement by a bracket 96 projecting inwardly from the main frame. A pin 97 projects laterally from the guide block 95 and has its outer end slidably mounted through a lug 98 depending from the bracket 96, and a coil spring 99 is arranged on the pin between the bearing block and said lug and serves to hold the bearing block in position so that each time the ratchet rod 89 is actuated the pawl 88 will engage the ratchet wheel 87 and thus feed the table 81 upwardly a distance equal to the thickness of a single card board blank.

100 is a foot piece attached to the bearing block 95 and resting on the floor and serves as a means to push the pawl 88 out of engagement with the ratchet wheel so that the table can be manually lowered by turning the hand wheel 86. Upon the release of the foot piece the spring 99 will move the pawl back into operative position.

101 indicates a stack of card board box body blanks arranged on the table and adapted to be held in position by guide bars 102 and 103 arranged in a horizontal plane with the top of the rotatable form, the guide bar 102 being relatively fixed and supported by the main frame, while the guide bar 103 is supported by arms 104 adjustably supported by brackets 105 carried by the main frame of the machine. By this construction the guide bar 103 may be adjusted laterally of the machine to accommodate blanks of different widths for different sized boxes. Each of the guide bars 102 and 103 is provided with a pair of depending guide members 106, those members carried by the guide bar 103 working in slots 107 formed in the table 80. It is to be noted that by virtue of the angle bar construction of the guide bars that one flange thereof will overlap the opposite sides of the stack of card board blanks and prevent the latter from buckling or bowing upwardly as they are separately fed off of the stack.

The blanks are adapted to be fed off of the top of the stack by suitable feed mechanism which in this instance consists of a pair of feed bars 108 adjustably connected to arms 109 pivotally mounted on the connecting rod 110 supported in the upper ends of actuating levers 11 that are pivotally mounted to the main frame at a point adjacent their lower ends as at 112. The lower end of each lever is provided with a slot

113 to receive a pin 114 projecting laterally from a wheel 115 mounted on the adjacent end of a transverse shaft 116. A bevel pinion 117 is fixed on the shaft 116 next to the right hand wheel 115 and meshes with a similar pinion 118 on the end of the power shaft 56. By this means reciprocating motion is communicated to the feed bars 108.

Figure 2:
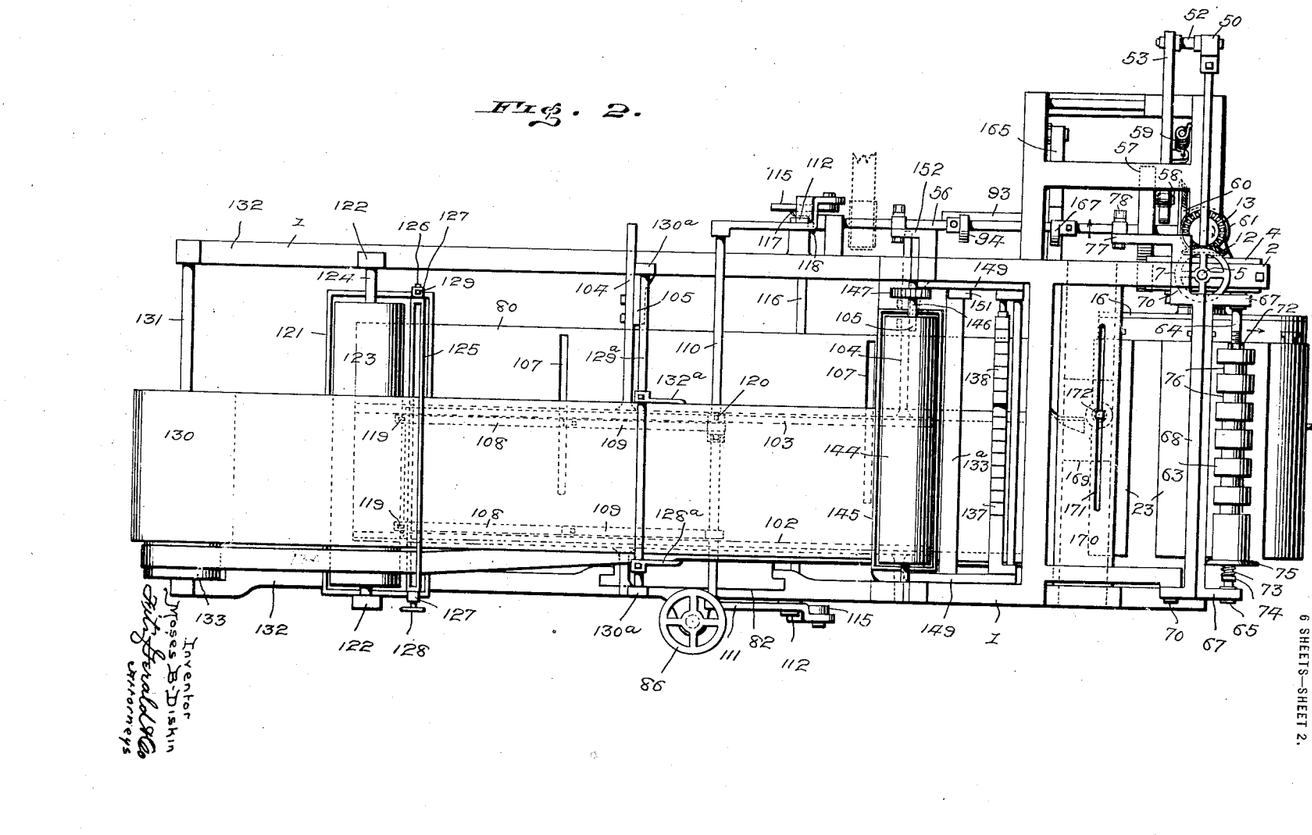
Fig. 2 represents a top plan view thereof.
Figure 3:
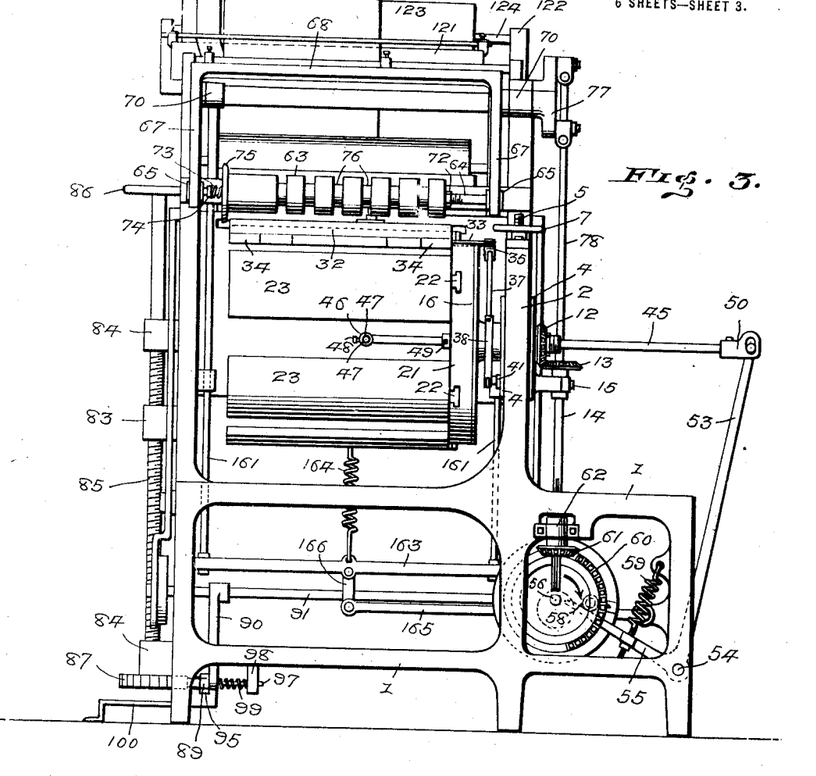
Fig. 3 represents an end elevation of the machine.
Figure 4:
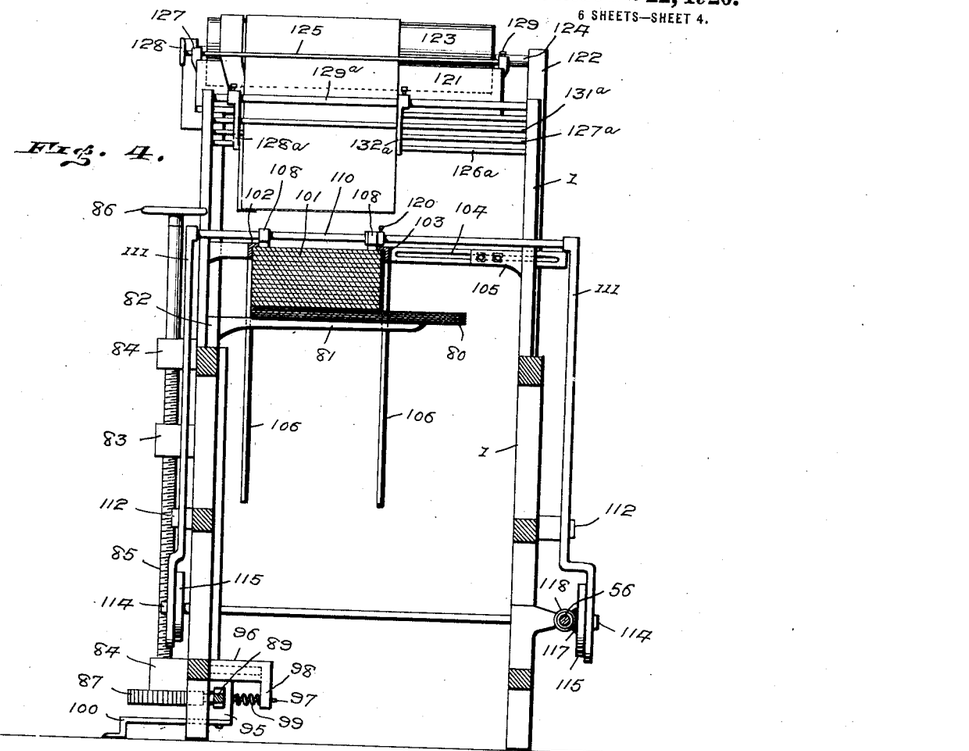
Fig. 4 represents a transverse sectional view taken on a plane indicated by the line 4—4 on Fig. 1.

The free end of each feed bar 108 is provided with a gripping finger 119 which is straight on one side and beveled or rounded on the other so that on each rearward stroke of the feed bars the fingers will grip and feed one blank rearwardly of the machine and when the feed bars move forwardly of the machine they will slide along on top of the blanks without disturbing their position and drop into position immediately in advance of the next lower blank. As shown in Fig. 2 these feed bars are arranged in juxtaposition to the guide bars so that their pulling force will not cause the blanks to bow or buckle upwardly.

The left hand feed bar remains in a relatively fixed position but the right hand one is adapted to be adjusted laterally on the connecting rod 110 and retained in adjusted position by collars 120 to effectively feed blanks of different sizes.

A glue pan 121 is supported in elevated position above the front end of the machine by standards 122. 123 is a glue roller rotatably mounted on a shaft 124 mounted in the standards 122.

A glue scraper is positioned immediately in rear of the glue roller and comprises a slotted bar 125 provided at its opposite ends with trunnions 126 journaled in brackets 127 on the glue pan. One of the trunnions is provided with a hand wheel 128 whereby the bar may be rotatably adjusted and 129 indicates a set screw for holding the bar 125 in adjusted position. The paper from the roll 130 is trained over the glue roller 123 and through the slot in the bar 125 and thence downwardly and rearwardly of the machine. By virtue of the paper passing through the slotted bar 125 it will be apparent that the latter can be adjusted with respect to the paper to regulate the amount of glue allowed to remain on the paper, that glue that is scraped off falling again into the glue pan. The roll of paper 130 is mounted on a shaft 131 journaled in horizontally extending arms 132 of the main frame.

133 indicates an idler roller mounted on shaft 131 over which the tape is trained from the roll of tape 134 mounted on a shaft 135 journaled in the upper edge of the water pan 136. Water need not necessarily but is preferably placed within the pan 136 so as to moisten the tape and thus make it easier to work the tape in as a binder for the box bottom and body. As shown in Figs. 1 and 2 the tape is trained over the glue roller 123 through the scraper bar 125 and through between the separator rods 126ª and 127ª and is guided in under the paper by a guide arm 128ª mounted on a cross-rod 129ª fixed in the standards 130ª of the main frame. While the tape is guided through between the separator rods 126ª and 127ª, the paper is guided through between the separator rod 127ª and another separator rod 131ª which enables the arm 128ª to guide the tape under the paper in a free and easy manner. 132ª is a paper guide arm that is like the arm 128ª adjustably mounted on the rod 129ª.

The paper and tape are then extended rearwardly and downwardly into engagement with the card board blank and are adapted to pass beneath a brush bar 133ª, which may be either a felt, solid material or bristle brush. The opposite ends of the brush are supported by rods 134ª adjustably mounted through cross-bars 135ª of the main frame. A spring 136ª is positioned on each rod between the cross-bar 135ª and the brush and serves to yieldingly hold the brush on the paper. By this construction and arrangement of the brush it will be seen that the paper and the tape will be pasted on to the blank as it is fed through the machine.

Figure 11:
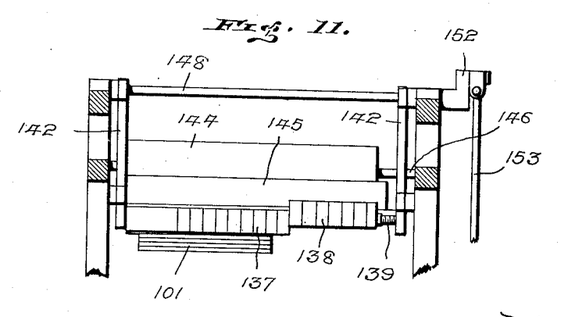
Fig. 11 represents a sectional elevation of the adjustable glue bar and its actuating mechanism.

Glue is adapted to be applied across the paper covered blank adjacent its end by a glue bar 137, Fig. 11, which comprises a plurality of segments or blocks 138 clamped on a rod 139 mounted in bearings 140, Fig. 1, that are mounted in slots 141 in the side arms 142. Tension springs 143 are mounted on the slots 141 between the bearing blocks and the upper end of the slot and provide yielding means for the glue bar when it is brought downwardly into engagement with the paper.

By forming the glue bar of a plurality of segments it is possible to adjust those that are not needed out of operative position, thus when using a glue bar of a length in proportion to the width of the blank it prevents any waste of glue. This glue bar is adapted to be brought up into engagement with and on a glue roller 144 rotatably mounted in a glue pan 145 and on a shaft 146 journaled in the main frame. 147 is a ratchet wheel fixed on the shaft 146. 148 is a shaft mounted above the glue roller and carries a pair of arms 149 to the outer ends of which are pivotally connected the side arms 142. A pair of arms 150 coextensive in length with the arms 149 are mounted immediately below the latter and pivoted to the main frame and to the side arms 142. One of these arms 150 is provided with a pawl 151 which is adapted to engage the ratchet wheel 147 on each upward movement of the glue bar and rotate the glue roller so as to bring a fresh supply of glue into position for engagement by the glue bar.

152 is an arm fixed on the end of the shaft 148 and has one end of a rod 153 pivotally connected to it, while the other end of the rod is connected to an eccentric 154 on the power shaft. This mechanism is so timed that it will operate to apply a coacting of glue across the blank just prior to its being fed through the machine.

The rear of the machine is provided with a vertically disposed wall 155 against which the ends of the card board blanks are adapted to abut, the lower end of the wall being curved as at 156, Fig. 1, so that in the event some of the ends of the blanks project beyond the others it will guide them back into vertical alinement as the table automatically feeds upwardly. This wall is provided adjacent its upper edge with a transverse slot 157 arranged in a horizontal plane with the uppermost blank of the stack and the top of the rotatable form so that the blanks can be fed therethrough.

158 is a cut-off knife carried by a crossbar 159 whose opposite ends are mounted in guideways 160 in opposite sides of the main frame for vertical movement. This bar 159 has rods 161 pivotally connected to its opposite ends that are mounted for vertical sliding movement in guides 162 carried on the wall 155. The lower ends of these rods are connected by a cross-bar 163, and a retractile spring 164 is connected between the bar and the wall 155 and serves to elevate the knife after each actuation. 165 is an arm having one end pivotally mounted to the right hand side of the main frame and its other end pivotally connected to the bar 163 by a link 166. A cam 167 is mounted on the power shaft 56 and is so timed that it will engage and actuate the arm 165 to lower the cut-off knife and sever the paper and tape after the covered blank has passed beyond the wall 155.

Figure 10:
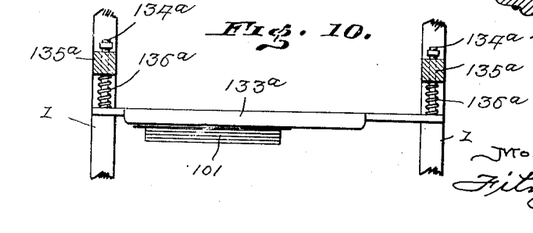
Fig. 10 represents a front elevation of the brush for applying the paper covering to the box blanks.

As shown in the drawings, and especially in Figs. 10 and 11, the paper covering is slightly wider than the card board blank so that its edges can be turned over the sides of the blank. As the paper covered blank passes through the wall 155, the right hand edge passes into engagement with and through edge finishing means that consist of a folder and a paster which will fold the projecting edge of the paper cover around the edge of and paste it to the under side of the blank. 168 is the folder which is supported from a block 169 adjustably mounted in a horizontally disposed guide 170 which is provided with a slot 171 to receive a clamping bolt 172 projecting upwardly from the block. As shown in Figs. 1 and 2, the folder is arranged in the same plane with the uppermost blank and in longitudinal alinement with the right hand side edge thereof.

The block 169 also supports a paster which consists of a pair of disks 173 rotatably mounted on a stud 174. A spring 175 is also mounted on the stud between the disks, and the upper disk is adapted to be adjusted relative to the lower disk against the tension of the spring through the medium of a nut 176. From this construction it will be seen that as the paper covered blank is fed through the machine the right hand side edge will pass through the folder 168 which will fold the projecting paper edge around under the edge of the blank in position to pass between the disks 173 which will effectively paste the folded paper edge to the card board blank, thus providing a finished edge for the open end of the box.

In the operation of the machine the glue bar 137 will descend into engagement with and apply a coating of glue across the paper covered end of the blank at a point adjacent the terminal end thereof and then begin to immediately rise and again move into engagement with the glue roller 144 to take up a fresh supply of glue for application to the next blank that is fed through the machine. As the feeder mechanism begins to feed the blank through the machine the brush 133 will paste the paper covering and the tape on to the blank so that the latter will be completely covered before being wound upon the box form. The paper covered blank will then pass through the machine until its edge engages beneath the gripper bar 32 whereupon the latter will be actuated to firmly grip the end of the blank upon the adjacent segment of the form.

Figures 5, 16:
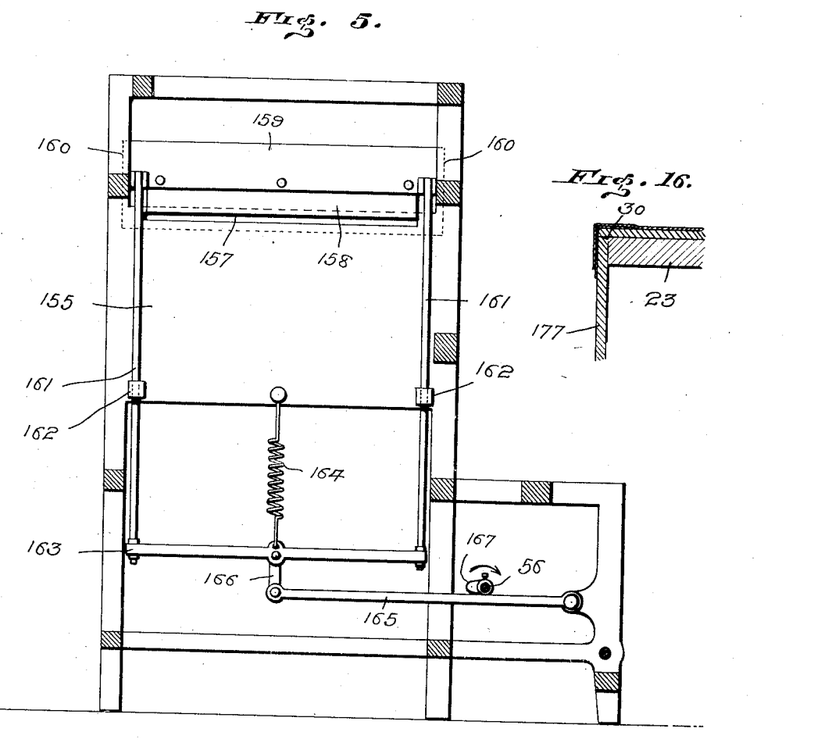
Fig. 5 represents a transverse sectional view taken on a plane indicated by the line 5—5 on Fig. 1.
Fig. 16 represents a detail sectional view on the line 16—16 of Fig. 15 through one end portion of the box form and box thereon.

Previous to starting the machine a box bottom 177, Fig. 16, is manually positioned in the open end of the form so that the knife edges 30 will grip and hold it in position while the box body is being wound upon the form.

After the paper covered blank has been fed into engagement with and gripped on the form, the press roller 63 will descend into engagement with the form and as the form begins to rotate the flange 75 will turn over the projecting edge of the paper cover and the tape and paste it against the bottom of the box, thus firmly binding the bottom to the box body, as clearly shown in Fig. 16. After the blank has passed through the machine beyond the wall 155 the cut-off knife will be actuated so as to sever the paper covering at a point to provide an overlapping end 178 as shown in Fig. 15. As the blank is wound around the form under the yielding tension of the press roller 63, the rear end of the blank will be pasted down on the coating of glue that was initially applied to the blank by the glue bar 137 and as the form continues to rotate the press roller will paste the overlapping end 178 down on to the box body thus covering up the seam formed by the overlapping ends of the box body blank.

By the time that the form has made one complete revolution or in other words finished the formation of the box, the roller 41 of the trip arm 39 will drop into the recess 43 and release the tension on the gripper bar so that when the ejector mechanism has ejected the box from the form, the tension of the spring 44 on the trip arm will serve to elevate the gripper bar into the position shown in Fig. 1. By releasing the tension on the gripper bar as just mentioned the ejector mechanism will operate to freely slide the box off of the form and the gripper bar 32 as will be apparent by reference to Figs. 1 and 15.

While the machine has been described as set for making a box of a given height and diameter, of course, it is to be understood that any variations in the diameter of a box may be had when desired by either expanding or contracting the segments of the rotatable form through the adjustment of the screw 28 and the corresponding parts coöperating with the form. When the diameter of the form is changed, the form will have to be adjusted vertically through the medium of the hand wheel 7 until the top thereof is tangential to the plane in which the uppermost card board blank rests. It is to be further noted that any height of box may be made by adjusting the machine so as to accommodate and feed the blanks of the desired width. The ejector mechanism can be also adjusted through the medium of the roller 58 carried by the cam wheel 57 to give the ejector rod 45 more or less of a throw as desired.

Should it be desired to form an elliptical box rather than a cylindrical one, the rotatable form just described can be removed and the form shown in Fig. 13 substituted therefor. In this elliptical form each of the segments 23 is provided with separate adjusting means such as a worm 179 engaging teeth 180 on the T-head 181 of the segments, as shown in Fig. 14. However, if desired, the elliptical form may be made so that all of the segments can be simultaneously adjusted.

While I have described the principle of operation of the invention together with the machine which I now consider to be the best embodiment thereof, I desire to have it understood that such changes in construction and arrangement of parts may be made when desired as are within the scope of the appended claims.

Having thus fully described my invention what I claim as new and desire to secure by Letters Patent is:

1. In a box making machine, a rotatable form, means for guiding the upper surface and edges of a blank to move tangentially to said form, means for pressing a continuous sheet down on said blank to be pasted thereto, means for supporting a stack of blanks under said guiding means and raising them to bring the uppermost blank against said guiding and pressing means as the blanks are fed therefrom one by one, means for feeding the uppermost blanks along the guiding means to the form to pull the sheet with them, and means for operating on the blank and sheet when fed to and wound on the form to complete a box therefrom.

2. In a box making machine, a rotatable form, a pair of guide bars for guiding the upper surface and side edges of a blank so that it passes tangentially to the form, means for pressing a continuous sheet down on said blank to be pasted thereto, a table underneath said guide bars and movable vertically to support a stack of blanks, means for intermittently raising said table to bring the uppermost blank against said guide bars and pressing means as the blanks are fed one by one to the form, a feeder working above and between said bars for feeding the uppermost blank and sheet with it to the form, and means coöperable with said blank and sheet as it is fed to and wound on the form to complete a box therefrom.

3. In a box making machine, a form, means for guiding an uppermost blank of a stack to said form, means for supporting a stack of blanks under the guiding means and raising same intermittently to bring the uppermost blank against the guiding means as the blanks are fed therefrom one by one, means for feeding the uppermost blank from the stack to the form, means for guiding a continuous sheet over the uppermost blank and pressing said sheet on said blank on the stack, means for supplying glue to paste said sheet on the uppermost blank, and means operated with the feeding means for cutting said sheet when the uppermost blank has been moved a certain distance in leaving the stack.

4. In a box making machine, means for feeding blanks one by one, means for delivering a sheet to press against one side of the blank as it is fed to be pasted thereto with one edge of the sheet projecting beyond one edge of the blank, means for folding said projecting edge of the sheet across and behind said edge of the blank as it is fed, and a pair of coaxial disks arranged to overlap opposite sides of said edge portion of the blank after such folding to press the sheet against the opposite sides of the blank at said edge thereof.

5. In a box making machine, a form, means for guiding blanks to said form, a yielding brush supported in relation to the guiding means, means for supporting a stack of blanks under the guiding means operable to raise the blanks and bring the uppermost blank against the guiding means, means for delivering a continuous sheet under said brush to be pressed thereby against the uppermost blank bearing against the guiding means, and means for supplying glue to paste said sheet on the blanks, and means operable for cutting said sheet as the blanks are moved a certain distance.

6. In a box making machine, a form, means for guiding the upper surface and edges of a blank to move to said form, means for pressing a continuous sheet down on said blank to be pasted thereto, means for supporting a stack of blanks under said guiding means and raising them to bring the uppermost blank against said guiding and pressing means as the blanks are fed therefrom one by one, means for feeding the uppermost blanks along the guiding means to the form to pull the sheet with them, means for applying paste on the sheet above the forward end of the uppermost blank on the stack, and means operable with the feeding means for cutting the sheet after the blank has moved a certain distance beyond the cutting means to leave a projecting end of the sheet to overlap the opposite end of the blank to be pasted thereto.

7. In a box making machine, means for feeding a sheet, a form to which the sheet is fed, glue supplying means, a glue bar including a rod and blocks thereon movable out of operative position, and means for supporting and operating said rod to bring said blocks into alternate engagement with the glue supplying means and sheet.

8. In a box making machine, a rotatable form having radially adjustable segments, an ejector member working axially within said form, and extensible arms carried by the member to project outwardly between said segments.

9. In a box making machine, a rotatable form embodying a head and radially adjustable segments carried thereby, said head having a hub, a bearing for said hub, and an ejector device slidable through said hub and having portions to extend outwardly between said segments.

10. In a box making machine, a rotatable form, means for guiding the upper surface and edges of a blank to move tangentially to said form, means for pressing a continuous sheet down on the blank to be pasted thereto, means for supporting the stack of blanks under said guiding means and raising them to bring the uppermost blank against said guiding and pressing means as the blanks are fed therefrom one by one, means for feeding the uppermost blank along the guiding means to the form to pull the sheet with it, means for guiding a tape to overlap one edge portion of the sheet to pass under said pressing means with the sheet to be pasted on the uppermost blank, means for supplying glue to said sheet and tape, whereby the tape is pasted to the sheet and said sheet and tape pasted to the blank under said pressing means, and means for operating on said blank, sheet and tape when fed to and wound on the form to complete a box therefrom.

In testimony whereof I have signed my name to this specification in the presence of the subscribing witness.

MOSES B. DISKIN.

Witness:
S. W. COCKRELL.